US009508154B2

(12) United States Patent
Lee et al.

(10) Patent No.: US 9,508,154 B2
(45) Date of Patent: Nov. 29, 2016

(54) MEDICAL IMAGING APPARATUS AND METHOD OF OPERATING THE SAME

(71) Applicant: SAMSUNG MEDISON CO., LTD., Gangwon-Do (KR)

(72) Inventors: Bong-heon Lee, Gangwon-do (KR); Hyuk-jae Chang, Seoul (KR); Nam-sik Chung, Seoul (KR); Geu-ru Hong, Seoul (KR); Hyun-joo Kim, Seoul (KR); Sung-wook Park, Gangwon-do (KR); Joo-hyun Song, Gangwon-do (KR); Sang-hoon Shin, Seoul (KR); Jin-yong Lee, Gangwon-do (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 57 days.

(21) Appl. No.: 14/550,726

(22) Filed: Nov. 21, 2014

(65) Prior Publication Data
US 2015/0302604 A1 Oct. 22, 2015

(30) Foreign Application Priority Data

Apr. 17, 2014 (KR) .......................... 10-2014-0046192

(51) Int. Cl.
*G06T 7/20* (2006.01)
*G06T 19/00* (2011.01)
(52) U.S. Cl.
CPC ................. *G06T 7/20* (2013.01); *G06T 19/00* (2013.01); *G06T 2207/10081* (2013.01); *G06T 2207/10088* (2013.01); *G06T 2207/10136* (2013.01); *G06T 2207/20104* (2013.01); *G06T 2210/41* (2013.01)

(58) Field of Classification Search
CPC ....... G06T 7/20; G06T 7/0012; G06T 15/08; G06T 19/00; G06T 2207/10081; A61B 8/08; A61B 5/0263
See application file for complete search history.

(56) References Cited

U.S. PATENT DOCUMENTS

| 5,963,211 A * | 10/1999 | Oikawa .................. G06T 17/10 345/424 |
| 7,604,597 B2 | 10/2009 | Murashita et al. |
| 8,224,047 B2 * | 7/2012 | Gerard ..................... A61B 8/08 382/128 |
| 2002/0032376 A1 * | 3/2002 | Miyazaki ............. A61B 5/0263 600/410 |
| 2003/0090593 A1 * | 5/2003 | Xiong ................ H04N 5/23248 348/620 |

(Continued)

FOREIGN PATENT DOCUMENTS

| JP | 2010-115372 A | 5/2010 |
| KR | 10-1064080 B1 | 9/2011 |

OTHER PUBLICATIONS

International Search Report and Written Opinion issued in corresponding International Patent Application No. PCT/KR2014/008693 on Jan. 5, 2015; 10 pages with English translation.

*Primary Examiner* — James A Thompson
*Assistant Examiner* — Tapas Mazumder
(74) *Attorney, Agent, or Firm* — McDermott Will & Emery LLP

(57) ABSTRACT

A medical imaging apparatus and a method of operating the same are provided. The method includes acquiring three-dimensional (3D) volume data about an object, generating a 3D image based on the 3D volume data, extracting a muscle tissue figure corresponding to a muscle tissue shape of the object by grouping voxels included in the 3D image, analyzing a motion of the object based on the extracted muscle tissue figure, and displaying the extracted muscle tissue figure and a result of the analysis.

17 Claims, 13 Drawing Sheets

(56) References Cited

U.S. PATENT DOCUMENTS

| | | |
|---|---|---|
| 2005/0111710 A1 | 5/2005 | Gritzky et al. |
| 2008/0004521 A1 | 1/2008 | Hundley et al. |
| 2009/0074280 A1 | 3/2009 | Lu et al. |
| 2010/0123714 A1 | 5/2010 | Langeland et al. |
| 2011/0178389 A1 | 7/2011 | Kumar et al. |
| 2012/0165664 A1 | 6/2012 | Hill et al. |

* cited by examiner

MEDICAL IMAGING APPARATUS AND METHOD OF OPERATING THE SAME

RELATED APPLICATIONS

This application claims the benefit of Korean Patent Application No. 10-2014-0046192, filed on Apr. 17, 2014, in the Korean Intellectual Property Office, the disclosure of which is incorporated herein in its entirety by reference.

BACKGROUND

1. Field

One or more embodiments of the present invention relate to a medical imaging apparatus and a method of operating the same, and more particularly, to a medical imaging apparatus capable of analyzing a motion of an object based on the shape of a muscle tissue of the object, and a method of operating the medical imaging apparatus.

2. Description of the Related Art

Various imaging apparatuses for imaging information about the tissue of a human body are used in many medical areas for the early diagnose of various diseases or surgical operations in this regard. Some examples of such medical imaging apparatuses are ultrasonic diagnosing apparatuses, computed tomography (CT) apparatuses, and magnetic resonance imaging (MRI) apparatuses.

Ultrasound diagnosis apparatuses irradiate an ultrasound signal generated by a transducer of a probe toward an object and receive information regarding an echo signal reflected from the object, thereby obtaining an image of a part inside the object. In particular, ultrasound diagnosis apparatuses are used for observation of the inside of an object, detection of foreign substances inside the object, diagnosis of damage thereof, etc. Such ultrasound diagnosis apparatuses have various advantages including stability, real-time display, and safety because there is no radioactive exposure compared to X-ray apparatuses. Thus, the ultrasound diagnosis apparatuses are commonly used together with other image diagnosis apparatuses.

CT is a medical examination for obtaining a cross-sectional image of an object by using X-rays and a computer. During CT, narrow X-ray beams generated by an X-ray apparatus are radiated toward a body while the body is rotated at several angles, so that tomographic images of specific areas of a scanned object can be reconstructed into a 2-dimensional (2D) cross-sectional image or a 3-dimensional (3D) image. Thus, body structures and changes (i.e., lesions) thereof may be more accurately detected by using CT compared to a simple X-ray scan.

MRI apparatuses acquire an image of an object based on information obtained by exposing an atomic nucleus to a magnetic field applied at an appropriate resonant frequency. Resonance of the atomic nucleus refers to a phenomenon wherein the atomic nucleus in a low energy state absorbs energy and is excited to a high energy state when a particular high frequency signal is incident onto the atomic nucleus by generating an external magnetic field around the atomic nucleus. As atomic nuclei have different resonance frequencies according to their types, their resonant states are affected by the strength of the external magnetic field. Also, since there are numerous atomic nuclei in a human body, a hydrogen atomic nucleus is generally used for MRI.

SUMMARY

One or more embodiments of the present invention include a medical imaging apparatus capable of analyzing a motion of an object based on a muscle tissue shape of the object, and a method of operating the same.

Additional aspects will be set forth in part in the description which follows and, in part, will be apparent from the description, or may be learned by practice of the presented embodiments.

According to one or more embodiments of the present invention, a method of operating a medical imaging apparatus includes acquiring three-dimensional (3D) volume data about an object; generating a 3D image based on the 3D volume data; extracting a muscle tissue figure corresponding to a muscle tissue shape of the object by grouping voxels included in the 3D image; analyzing a motion of the object based on the extracted muscle tissue figure; and displaying the extracted muscle tissue figure and a result of the analysis.

The extracting of the muscle tissue figure includes connecting a first point where a first voxel included in the 3D image is located in n-th frame data to a second point where the first voxel is located in (n+1)th frame data.

The volume data includes at least one selected from ultrasound volume data, computed tomography (CT) volume data, and magnetic resonance (MR) volume data.

The method further includes receiving a user input for selecting a reference region. The extracting of the muscle tissue figure includes grouping voxels included in the selected reference region.

The muscle tissue figure includes at least one selected from a dot, a line, a surface, and a three-dimensional structure.

The analyzing the motion of the object includes tracking a motion of the muscle tissue figure by tracking voxels included in the muscle tissue figure.

The analyzing the motion of the object includes analyzing a change of a position of the muscle tissue figure in time.

The displaying of the muscle tissue figure and the result of the analysis includes displaying the muscle tissue figure such that the muscle tissue figure overlaps the 3D image.

The displaying of the muscle tissue figure and the result of the analysis includes displaying the muscle tissue figure of the object and a specific time point in a motion cycle of the object in correspondence to each other.

According to one or more embodiments of the present invention, a medical imaging apparatus includes a data acquisition unit which acquires 3D volume data about an object; an image processing unit which generates a 3D image based on the 3D volume data, groups voxels included in the 3D image to extract a muscle tissue figure corresponding to a muscle tissue shape of the object, and analyzes a motion of the object based on the extracted muscle tissue figure; and a display unit which displays the extracted muscle tissue figure and a result of the analysis.

The image processing unit extracts the muscle tissue figure by connecting a first point where a first voxel included in the 3D image is located in n-th frame data to a second point where the first voxel is located in (n+1)th frame data.

The volume data includes at least one selected from ultrasound volume data, computed tomography (CT) volume data, and magnetic resonance (MR) volume data.

The medical imaging apparatus further includes a user input unit which receives a user input for selecting a reference region. The image processing unit extracts the muscle tissue figure by grouping voxels included in the selected reference region.

The image processing unit analyzes the motion of the object by tracking a motion of the muscle tissue figure by tracking voxels included in the muscle tissue figure.

The image processing unit analyzes the motion of the object based on a change of a position of the muscle tissue figure in time.

The display unit displays the muscle tissue figure to overlap the 3D image.

The display unit displays a specific time point in a motion cycle of the object and the muscle tissue figure of the object in correspondence to each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
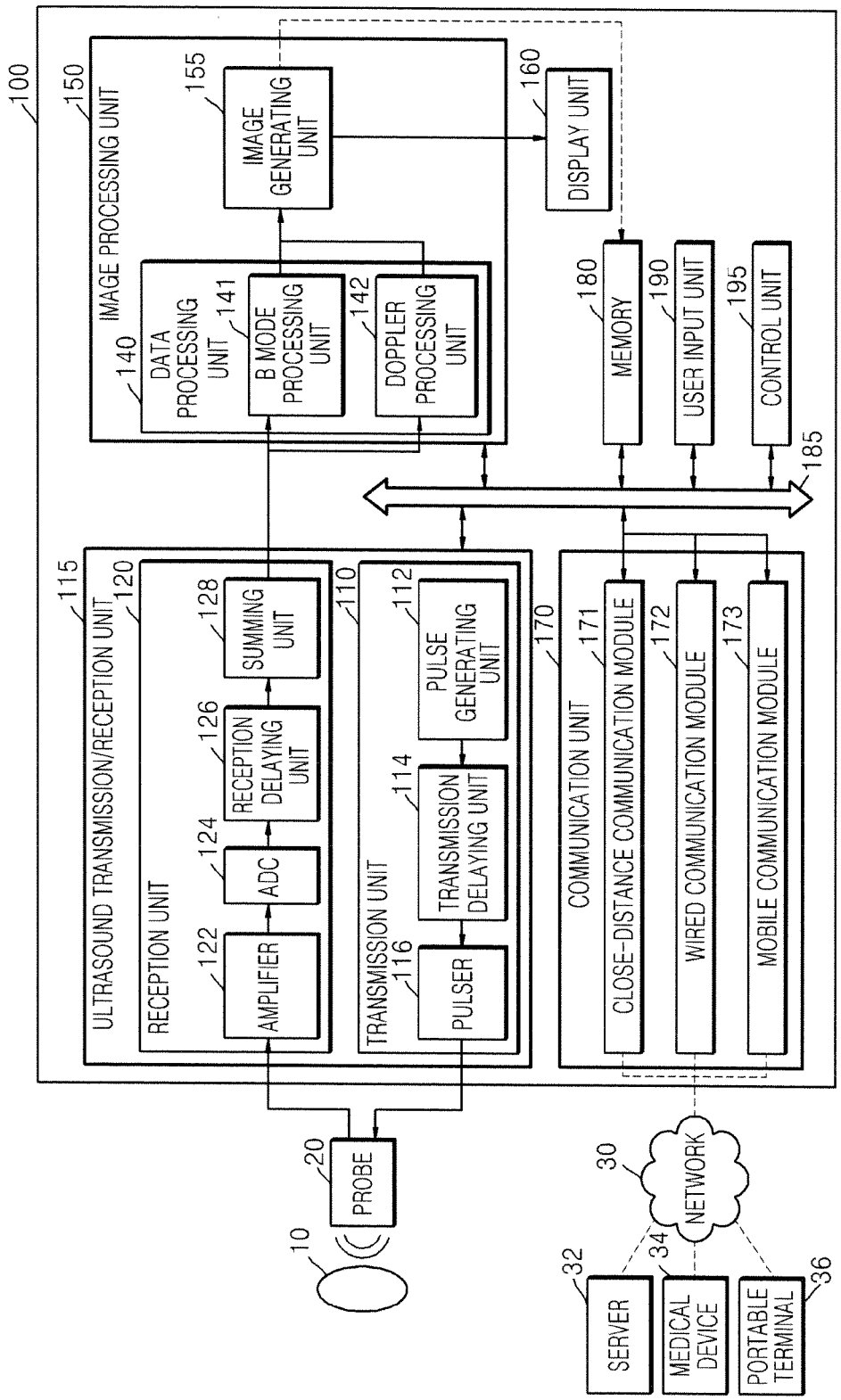
FIG. 1 is a block diagram of an ultrasound diagnosis apparatus according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Although general terms widely used at present were selected for describing the present invention in consideration of the functions thereof, these general terms may vary according to intentions of one of ordinary skill in the art, case precedents, the advent of new technologies, and the like. Terms arbitrarily selected by the applicant of the present invention may also be used in a specific case. In this case, their meanings need to be given in the detailed description of the present invention. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. In addition, terms such as " . . . unit", " . . . module", or the like refer to units that perform at least one function or operation, and the units may be implemented as hardware or software or as a combination of hardware and software.

Throughout the specification, "image" may refer to multi-dimensional data formed of discrete image elements (e.g., pixels in a two-dimensional (2D) image and voxels in a three-dimensional (3D) image). For example, an image may be a medical image of an object that is acquired by an ultrasound diagnosis apparatus, a CT apparatus, an MRI apparatus, or the like (e.g., an ultrasonic image, a CT image, or an MR image), but is not limited thereto.

An ultrasonic image may be acquired by irradiating ultrasound signals generated by transducers of a probe to a target object and receiving information regarding echo signals reflected from the target object. An ultrasonic image may be of various types, for example, an amplitude (A) mode image, a brightness (B) mode image, a color (C) mode image, a Doppler (D) mode image, and a combination thereof. An ultrasonic image may be a 2D image or a 3D image.

A CT image may be obtained by synthesizing a plurality of X-ray images that are obtained by scanning an object while a CT apparatus rotates around at least one axis with respect to the object.

An MR image may be obtained by using the nuclear magnetic resonance principle.

Throughout the specification, "object" may be a person, animal, or a part of a person or animal. For example, the object may be the liver, the heart, the womb, the brain, a breast, the abdomen, or a blood vessel. The object may be a phantom. The phantom means a material having a volume with approximately the same intensity and effective atomic number of a living thing.

Throughout the specification, "user" refers to a medical professional, such as a medical doctor, a nurse, a medical laboratory technologist, and an engineer who repairs a medical apparatus, but the user is not limited thereto.

Embodiments of the present invention are described in detail herein with reference to the accompanying drawings so that this disclosure may be easily performed by one of ordinary skill in the art to which the present invention pertain. The invention may, however, be embodied in many different forms and should not be construed as being limited to the embodiments set forth herein.

FIG. 1 is a block diagram of a structure of a medical imaging apparatus according to an embodiment of the present invention.

The medical imaging apparatus of FIG. 1 may be an ultrasound diagnosis device 100 that may include a probe 20, an ultrasound transmission/reception unit 115, an image processing unit 150, a display unit 160, a communication unit 170, a memory 180, a user input unit 190, and a control unit 195. The components stated above may be connected to one another via buses 185, and the image processing unit 150 may include an image generating unit 155.

The ultrasound diagnosis device 100 may be a cart type device or a portable type device. Examples of portable ultrasound diagnosis devices may include, but are not limited thereto, a PACS viewer, a smart phone, a laptop computer, a personal digital assistant (PDA), and a tablet PC.

The probe 20 transmits ultrasound waves to an object 10 in response to a driving signal applied by the ultrasound transmission/reception unit 115 and receives echo signals reflected by the object 10. The probe 20 includes a plurality of transducers, and the plurality of transducers oscillate in response to electric signals and generate acoustic energy, that is, ultrasound waves. Furthermore, the probe 20 may be connected to the main body of the ultrasound diagnosis device 100 wiredly or wirelessly. According to embodiments of the present invention, the ultrasound diagnosis device 100 may include a plurality of probes 20.

A transmission unit 110 supplies a driving signal to the probe 20, and includes a pulse generating unit 112, a transmission delaying unit 114, and a pulser 116. The pulse generating unit 112 generates pulses for forming transmission ultrasound waves based on a predetermined pulse repetition frequency (PRF), and the transmission delaying unit 114 applies, to the pulses, a delay time for determining the transmission directionality thereof. Pulses to which a delay time is applied respectively correspond to a plurality of piezoelectric vibrators included in the probe 20. The pulser 116 applies a driving signal or a driving pulse to the probe 20 based on timing that corresponds to each of the pulses having the delay time applied thereto.

A reception unit 120 generates ultrasound data by processing echo signals received from the probe 20 and may include an amplifier 122, an analog-digital converter (ADC) 124, a reception delaying unit 126, and a summing unit 128. The amplifier 122 amplifies the echo signals in each channel, and the ADC 124 performs analogue-to-digital conversion on the amplified echo signals. The reception delaying unit 126 applies, to the digital-converted echo signals, delay times for determining the reception directionality thereof, and the summing unit 128 generates ultrasound data by summing the echo signals processed by the reception delaying unit 126.

The image processing unit 150 generates an ultrasound image by scan-converting ultrasound data generated by the ultrasound transmission/reception unit 115.

Meanwhile, an ultrasound image may be not only a grayscale ultrasound image obtained by scanning a target object in an amplitude (A) mode, a brightness (B) mode, and a motion (M) mode, but also a Doppler image showing a movement of an object. The Doppler image may be a blood flow Doppler image showing flow of blood (or a color Doppler image), a tissue Doppler image showing a movement of tissues, and a spectral Doppler image showing a moving speed of an object via a waveform.

A B mode processing unit 141 extracts B mode components from ultrasound data and processes the B mode components. An image generating unit 155 may generate an ultrasound image indicating signal intensities as brightness based on the extracted B mode components.

Similarly, a Doppler processing unit 142 may extract Doppler components from ultrasound data, and the image generating unit 155 may generate a Doppler image indicating a movement of an object via colors or waveforms based on the extracted Doppler components.

According to an embodiment, the image generating unit 155 may generate a 2D or 3D ultrasound image of an object and may also generate an elasticity image to show the pressure-deformation of the object 10. Furthermore, the image generating unit 155 may display various pieces of additional information in an ultrasound image by using texts and graphics. Meanwhile, the generated ultrasound image may be stored in the memory 180.

The display unit 160 displays the generated ultrasound image. The display unit 160 may display not only an ultrasound image, but also various information processed by the ultrasound diagnosis device 100 in a screen image via a graphic user interface (GUI). Meanwhile, the ultrasound diagnosis device 100 may include two or more display units 160 according to embodiments of the present invention.

The display 160 may include at least one of a liquid crystal display (LCD), a thin film transistor-liquid crystal display (TFT-LCD), an organic light-emitting diode (OLED), a flexible display, a 3D display, and an electrophoretic display.

When a touch screen is constructed by forming a layer structure from the display unit 160 and a user input unit, the display unit 160 may be used as an input device that allows a user to input data via touching, as well as an output device.

The touch screen may be configured to detect a touch pressure in addition to a touch input position and a touched area. The touch screen may also be configured to detect a proximity touch as well as a real touch.

Throughout the specification, the term "real touch" denotes a case in which a pointer really touches a screen, and the term "proximity touch" denotes a case in which the pointer does not actually touch the screen but approaches the screen at a certain distance. The pointer used herein denotes a touch instrument for really touching or proximity-touching a displayed screen. The pointer may be an electronic pen, a finger, etc.

Although not illustrated, in order to detect the real touch or the proximity touch on the touch screen, the ultrasound diagnostic apparatus 100 may include various sensors inside or near the touch screen. An example of a sensor used to detect the real touch or the proximity touch on the touch screen is a tactile sensor.

The tactile sensor detects a touch by a specific object to the same or higher degree as a human. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor. The proximity sensor detects the existence of an object that approaches a predetermined detection surface or that is placed in the vicinity of the predetermined detection surface by using an electromagnetic force or infrared rays without any mechanical contact.

Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, and the like.

The communicator 170 is connected to a network 30 in a wired or wireless manner to communicate with an external device or server. The communication unit 170 may exchange data with a hospital server or other medical apparatuses in a hospital that is connected thereto via a medical image information system (e.g., a Picture Archiving and Communication System (PACS)). The communication unit 170 may perform data communication according to the Digital Imaging and Communications in Medicine (DICOM) Standard.

In detail, the communication unit 170 may transmit and receive data related to the diagnosis of an object, such as an ultrasound image, ultrasound data, Doppler data, etc., of the object, through the network 30, and may also transmit and receive a medical image captured by another medical apparatus, such as a CT apparatus, an MRI apparatus, or an X-ray apparatus. Furthermore, the communication unit 170 may receive information about a diagnosis history or a medical treatment schedule of a patient from a server and utilize the received information to diagnose the patient. In addition, the communicator 170 may perform data communication with a portable terminal of a medical doctor or a patient, in addition to a server or medical apparatus of a hospital.

The communication unit 170 may be wiredly or wirelessly connected to the network 30 and thus may exchange data with a server 32, a medical apparatus 34, or a portable terminal 36. The communicator 170 may include one or more elements for communication with an external device. For example, the communicator 170 may include a close-distance communication module 171, a wired communication module 172, and a mobile communication module 173.

The close-distance communication module 171 may refer to a module for close-distance communication within a predetermined distance. Examples of close-distance communication techniques according to an embodiment of the present invention may include, but are not limited thereto, wireless LAN, Wi-Fi, Bluetooth, Zigbee, Wi-Fi Direct (WFD), ultra wideband (UWB), infrared data association (IrDA), Bluetooth Low Energy (BLE), and near field communication (NFC).

The wired communication module 172 refers to a module for communication using electric signals or optical signals. Examples of wired communication techniques according to an embodiment of the present invention may include a pair cable, a coaxial cable, an optical fiber cable, and an Ethernet cable.

The mobile communication module 173 transmits and receives wireless signals with at least one from among a station, an external terminal, and a server on a mobile communication network. The wireless signals may be voice call signals, video call signals, or various types of data for transmission and reception of text/multimedia messages.

The memory 180 stores various data processed by the ultrasound diagnosis device 100. For example, the memory 180 may store medical data related to diagnosis of an object, such as ultrasound data and an ultrasound image that are input or output, and may also store algorithms or programs which are to be executed in the ultrasound diagnosis device 100.

The memory 180 may be any of various storage media, e.g., a flash memory, a hard disk drive, an EEPROM, etc. The ultrasound diagnosis apparatus 100 may utilize a web storage or a cloud server which performs an online storage function of the memory 180.

The user input unit 190 allows a user to input data for controlling the ultrasound diagnosis device 100. The user input unit 190 may include hardware components, such as a keypad, a mouse, a touch pad, a touch screen, and a jog switch. However, the present invention is not limited thereto, and the user input unit 190 may further include other various input means including an electrocardiogram measuring module, a respiration measuring module, a voice recognition sensor, a gesture recognition sensor, a fingerprint recognition sensor, an iris recognition sensor, a depth sensor, a distance sensor, etc.

In particular, the user input unit 190 may further include the touch screen having the layer structure formed by the touch pad and the display unit 160.

In this case, the ultrasound diagnosis apparatus 100 may display on the touch screen a specific mode ultrasound image and a control panel for an ultrasound image. In addition, the ultrasound diagnosis apparatus 100 may sense through the touch screen a user's touch gesture with regard to an ultrasound image.

The ultrasound diagnosis apparatus 100 according to the present embodiment may physically include some buttons, frequently used by a user, from among a plurality of buttons included in a control panel of general ultrasound diagnostic apparatuses. Other buttons may be provided through a GUI on the touch screen.

The control unit 195 controls all operations of the ultrasound diagnosis apparatus 100. In other words, the control unit 195 may control operations among the probe 20, the ultrasound transmission/reception unit 115, the image processing unit 150, the communication unit 170, the memory 180, and the user input unit 190 shown in FIG. 1.

All or some of the probe 20, the ultrasound transmission/reception unit 115, the image processing unit 150, the communication unit 170, the memory 180, the user input unit 190, and the control unit 195 may be operated by software modules. However, the present invention is not limited thereto, and some of the components stated above may be operate by hardware modules. Furthermore, at least one of the ultrasound transmission/reception unit 115, the image processing unit 150, and the communication unit 170 may be included in the control unit 195. However, the present invention is not limited thereto.

Figure 2:
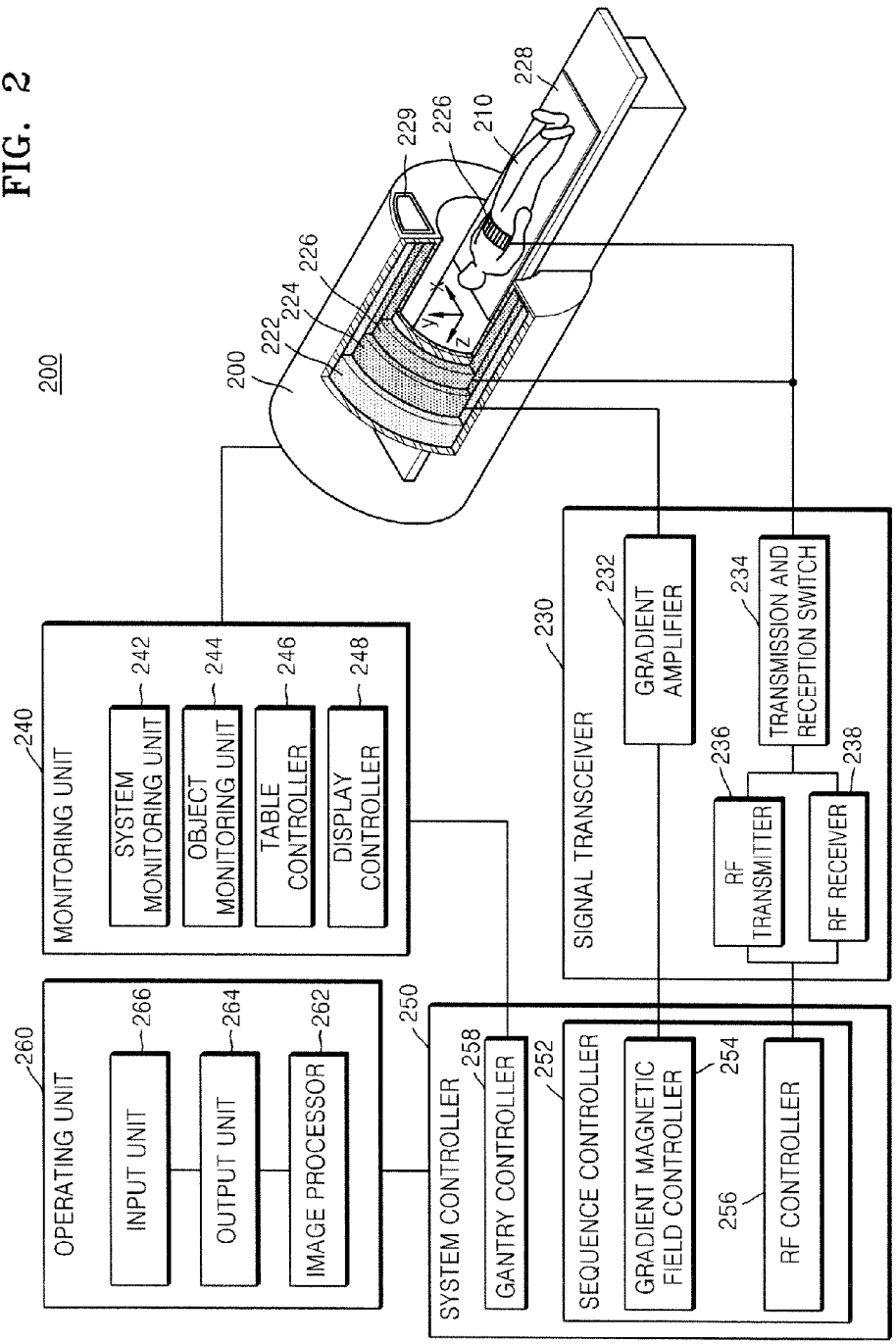
FIG. 2 is a block diagram of a magnetic resonance imaging (MRI) apparatus according to an embodiment of the present invention.

FIG. 2 is a block diagram of a medical imaging apparatus 200 according to an embodiment of the present invention. The medical imaging apparatus 200 may be an MRI apparatus, and may include a gantry 220, a signal transceiver 230, a monitoring unit 240, a system controller 250, and an operating unit 260.

The gantry 220 blocks electromagnetic waves generated by a main magnet 222, a gradient coil 224, and an RF coil 226 from being externally emitted. A magnetostatic field and a gradient magnetic field are formed at a bore in the gantry 220, and an RF signal is irradiated towards an object 210.

The main magnet 222, the gradient coil 224, and the RF coil 226 may be arranged in a predetermined direction of the gantry 220. The predetermined direction may be a coaxial cylinder direction. The object 210 may be disposed on a table 228 that is capable of being inserted into a cylinder along a horizontal axis of the cylinder.

The main magnet 222 generates a magnetostatic field or a static magnetic field for aligning a direction of magnetic dipole moments of atomic nuclei in the object 210 in a constant direction. A precise and accurate MR image of the object 210 may be obtained when a magnetic field generated by the main magnet 222 is strong and uniform.

The gradient coil 224 includes X, Y, and Z coils for generating gradient magnetic fields in X-, Y-, and Z-axis directions crossing each other at right angles. The gradient coil 224 may provide location information of each region of the object 210 by differently inducing resonance frequencies according to the regions of the object 210.

The RF coil 226 may radiate an RF signal toward a patient and receive an MR signal emitted from the object 210. In detail, the RF coil 226 may transmit an RF signal having the same frequency as that of a processional motion of atomic nuclei to the patient, stop transmitting the RF signal, and then receive an MR signal emitted from the object 210.

For example, in order to make an atomic nucleus transit from a low energy state to a high energy state, the RF coil 226 may generate and apply an electromagnetic wave signal having an RF corresponding to a type of the atomic nucleus, for example, an RF signal, to the object 210. When the electromagnetic wave signal generated by the RF coil 226 is applied to the atomic nucleus, the atomic nucleus may transit from the low energy state to the high energy state. Then, when electromagnetic waves generated by the RF coil 226 disappear, the atomic nucleus to which the electromagnetic waves were applied transits from the high energy state to the low energy state, thereby emitting electromagnetic waves having a Larmor frequency. In other words, when the applying of the electromagnetic wave signal to the atomic nucleus is stopped, an energy level of the atomic nucleus is changed from a high energy level to a low energy level, and thus the atomic nucleus may emit electromagnetic waves having a Larmor frequency. The RF coil 226 may receive electromagnetic wave signals from atomic nuclei in the object 210.

The RF coil 226 may be realized as one RF transmitting and receiving coil having both a function of generating electromagnetic waves having a wireless frequency corresponding to a type of an atomic nucleus and a function of receiving electromagnetic waves emitted from an atomic nucleus. Alternatively, the RF coil 226 may be realized as a transmission RF coil having a function of generating electromagnetic waves having a wireless frequency corresponding to a type of an atomic nucleus, and a reception RF coil having a function of receiving electromagnetic waves emitted from an atomic nucleus.

The RF coil 226 may be fixed to the gantry 220 or may be detachable. When the RF coil 226 is detachable, the RF coil 226 may be an RF coil for a part of the object, such as a head RF coil, a chest RF coil, a leg RF coil, a neck RF coil, a shoulder RF coil, a wrist RF coil, or an ankle RF coil.

The RF coil 226 may communicate with an external apparatus via wires and/or wirelessly, and may also perform dual tune communication according to a communication frequency band.

The RF coil 226 may be a birdcage coil, a surface coil, or a transverse electromagnetic (TEM) coil according to structures of coils.

The RF coil 226 may be a transmission exclusive coil, a reception exclusive coil, or a transmission and reception coil according to methods of transmitting and receiving an RF signal.

The RF coil 226 may be an RF coil for various channels, such as 16 channels, 32 channels, 72 channels, and 144 channels.

The gantry 220 may further include a display 229 disposed outside the gantry 220 and a display (not shown) disposed inside the gantry 220. The gantry 220 may provide predetermined information to the user or the object through the display 29 and the display respectively disposed outside and inside the gantry 20.

The signal transceiver 230 may control the gradient magnetic field formed inside the gantry 220, i.e., in the bore, according to a predetermined MR sequence, and control transmission and reception of an RF signal and an MR signal.

The signal transceiver 230 may include a gradient amplifier 232, a transmission and reception switch 234, an RF transmitter 236, and an RF receiver 238.

The gradient amplifier 232 drives the gradient coil 224 included in the gantry 220, and may supply a pulse signal for generating a gradient magnetic field to the gradient coil 224 according to control of a gradient magnetic field controller 254. By controlling the pulse signal supplied from the gradient amplifier 232 to the gradient coil 224, gradient magnetic fields in X-, Y-, and Z-axis directions may be composed.

The RF transmitter 236 and the RF receiver 238 may drive the RF coil 226. The RF transmitter 236 may supply an RF pulse having a Larmor frequency to the RF coil 226, and the RF receiver 238 may receive an MR signal received by the RF coil 226.

The transmission and reception switch 234 may adjust transmitting and receiving directions of the RF signal and the MR signal. For example, the RF signal may be irradiated to the object 210 through the RF coil 226 during a transmission mode, and the MR signal may be received by the object 210 through the RF coil 226 during a reception mode.

The transmission and reception switch 234 may be controlled by a control signal output by an RF controller 256.

The monitoring unit 240 may monitor or control the gantry 220 or devices mounted on the gantry 220. The monitoring unit 240 may include a system monitoring unit 242, an object monitoring unit 244, a table controller 246, and a display controller 248.

The system monitoring unit 242 may monitor and control a state of a magnetostatic field, a state of a gradient magnetic field, a state of an RF signal, a state of an RF coil, a state of a table, a state of a device measuring body information of an object, a power supply state, a state of a thermal exchanger, and a state of a compressor.

The object monitoring unit 244 monitors a state of the object 210. In detail, the object monitoring unit 244 may include a camera for observing a movement or position of the object 210, a respiration measurer for measuring the respiration of the object 210, an electrocardiogram (ECG) measurer for measuring an ECG of the object 210, or a temperature measurer for measuring a temperature of the object 210.

The table controller 246 controls a movement of the table 228 on which the object 210 is positioned. The table controller 246 may control the movement of the table 228 according to sequence control of a sequence controller 252. For example, during moving imaging of the object 210, the table controller 246 may continuously or discontinuously move the table 228 according to the sequence control of the sequence controller 252, and thus, the object 210 may be photographed in a field of view (FOV) larger than that of the gantry 220.

The display controller 248 controls the display 229 and the display respectively outside and inside the gantry 220. In detail, the display controller 248 may turn on or off the display 229 and the display outside and inside the gantry 220, and may control a screen to be output on the display 229 and the display outside and inside the gantry 220. Also, when a speaker is located inside or outside the gantry 220, the display controller 248 may turn on or off the speaker or control the speaker to output sound.

The system controller 250 may include the sequence controller 252 for controlling a sequence of signals formed in the gantry 220, and a gantry controller 258 for controlling the gantry 220 and the devices mounted on the gantry 220.

The sequence controller 252 may include the gradient magnetic field controller 254 for controlling the gradient amplifier 232, and the RF controller 256 for controlling the RF transmitter 236, the RF receiver 238, and the transmission and reception switch 234. The sequence controller 252 may control the gradient amplifier 232, the RF transmitter 236, the RF receiver 238, and the transmission and reception switch 234 according to a pulse sequence received from the operating unit 260. The pulse sequence includes all information required to control the gradient amplifier 232, the RF transmitter 236, the RF receiver 238, and the transmission and reception switch 234, and may include, for example, information about strength, an application time, and an application timing of a pulse signal applied to the gradient coil 224.

The operating unit 260 requests the system controller 250 to transmit pulse sequence information while controlling an overall operation of the MRI apparatus.

The operating unit 260 may include an image processor 262 for processing an MR signal received from the RF receiver 238, an output unit 264, and an input unit 266.

The image processor 262 processes an MR signal received from the RF receiver 238 so as to generate MR image data of the object 210.

The image processor 262 performs any one of various signal processes, such as amplification, frequency transformation, phase detection, low frequency amplification, and filtering, on an MR signal received by the RF receiver 238.

The image processor 262 may arrange digital data in a k space (for example, also referred to as a Fourier space or frequency space) of a memory, and rearrange the digital data into image data via 2D or 3D Fourier transformation.

The k space denotes a collection of raw data about an MR signal, and may include position information and contrast information.

Digital data arranged in the k space may be undersampled data. Accordingly, some of the lines of the k space are empty without being filled with data.

The image processor 262 may perform a composition process or difference calculation process on image data, if required. The composition process may include an addition process on a pixel or a maximum intensity projection (MIP) process. The image processor 262 may store in a memory (not shown) or an external server not only rearranged image data but also image data on which a composition process or difference calculation process has been performed.

Signal processes applied to MR signals by the image processor 262 may be performed in parallel. For example, a signal process may be performed on a plurality of MR signals received by a multi-channel RF coil in parallel so as to rearrange the plurality of MR signals as image data.

The output unit 264 may output image data generated or rearranged by the image processor 262 to the user. Also, the output unit 264 may output information required for the user to manipulate the MRI apparatus, such as user interface (UI), user information, or object information. The output unit 264 may include a speaker, a printer, a cathode-ray tube (CRT) display, a liquid crystal display (LCD), a plasma display panel (PDP), an organic light-emitting device (OLED) display, a field emission display (FED), a light-emitting diode (LED) display, a vacuum fluorescent display (VFD), a digital light processing (DLP) display, a 3D display, or a transparent display, or any one of various output devices that are well known to one of ordinary skill in the art.

The user may input object information, parameter information, a scan condition, a pulse sequence, or information about image composition or difference calculation by using the input unit 266. The input unit 266 may include a keyboard, a mouse, a track ball, a voice recognizer, a gesture recognizer, or a touch screen, or may include any one of other various input devices that are well known to one of ordinary skill in the art.

The signal transceiver 230, the monitoring unit 240, the system controller 250, and the operating unit 260 are separate components in FIG. 2, but it is obvious to one of ordinary skill in the art that respective functions of the signal transceiver 230, the monitoring unit 240, the system controller 250, and the operating unit 260 may be performed by another component. For example, the image processor 262 converts an MR signal received by the RF receiver 238 into a digital signal, but such a conversion may be directly performed by the RF receiver 238 or the RF coil 226.

The gantry 220, the RF coil 226, the signal transceiver 230, the monitoring unit 240, the system controller 250, and the operating unit 260 may be connected to each other via wires or wirelessly. When they are connected wirelessly, the MRI apparatus 200 may further include an apparatus (not shown) for synchronizing clocks therebetween. Communication between the gantry 220, the RF coil 226, the signal transceiver 230, the monitoring unit 240, the system controller 250, and the operating unit 260 may be performed by using a high-speed digital interface, such as low voltage differential signaling (LVDS), asynchronous serial communication, such as universal asynchronous receiver transmitter (UART), a low-delay network protocol, such as an error synchronous serial communication or a controller area network (CAN), or optical communication, or any other communication method that is well known to one of ordinary skill in the art.

Figure 3:
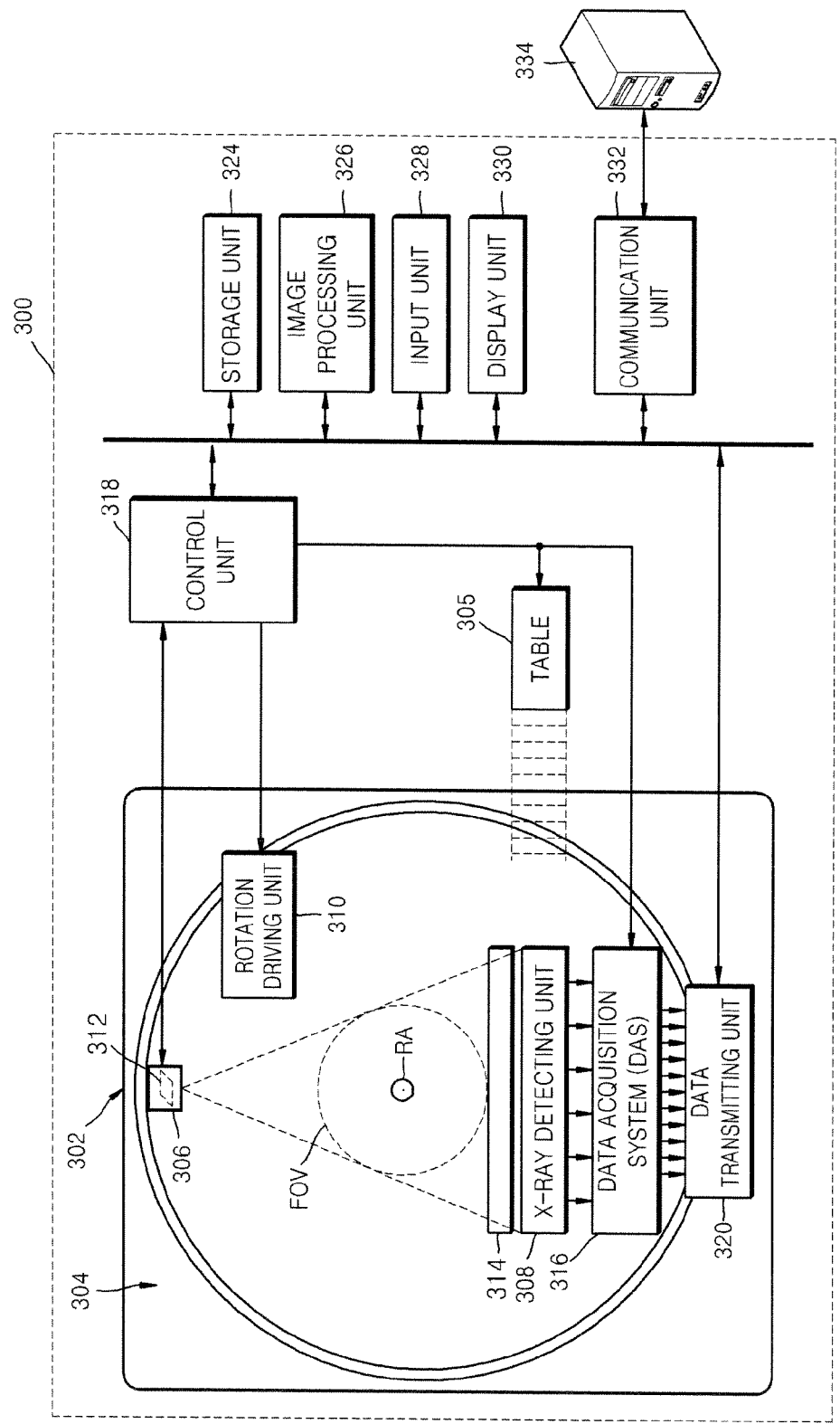
FIG. 3 is a block diagram of a computed tomography (CT) apparatus according to an embodiment of the present invention.

FIG. 3 is a block diagram of a medical imaging apparatus 300 according to an embodiment of the present invention. The medical imaging apparatus 300 may be a CT apparatus. Referring to FIG. 3, the CT apparatus 300 may include a gantry 302, a table 305, an X-ray generating unit 306, and an X-ray detecting unit 308.

The gantry 302 may include the X-ray generating unit 306 and the X-ray detecting unit 308, and an object may be positioned on the table 305. The table 305 may move in a predetermined direction (e.g., at least one of up, down, right, and left directions) during a CT scan. The table 305 may tilt or rotate by a predetermined angle in a predetermined direction, and the gantry 302 may also tilt by a predetermined angle in a predetermined direction.

The CT apparatus 300 may include a control unit 318, a storage unit 324, an image processing unit 326, an input unit 328, a display unit 330, and a communication unit 332.

The gantry 302 may include a rotating frame 304, the X-ray generating unit 306, the X-ray detecting unit 308, a rotation driving unit 310, a data acquisition system (DAS) 316, and a data transmitting unit 320.

The gantry 302 may include the rotating frame 304 having a loop shape capable of rotating with respect to a predetermined rotation axis RA. Also, the rotating frame 304 may have a disc shape.

The rotating frame 304 may include the X-ray generating unit 306 and the X-ray detecting unit 308 that face each other so as to have predetermined field of views FOV. The rotating frame 304 may also include an anti-scatter grid 314. The anti-scatter grid 314 may be positioned between the X-ray generating unit 306 and the X-ray detecting unit 308.

In a medical imaging apparatus, X-ray radiation that reaches a detector (or a photosensitive film) includes not only attenuated primary radiation that forms a valuable image but also scattered radiation that deteriorates a quality of an image. In order to transmit the primary radiation and to attenuate the scattered radiation, the anti-scatter grid 314 may be positioned between a patient and the detector (or the photosensitive film).

For example, the anti-scatter grid 314 may be formed by alternately stacking lead foil strips and an interspace material such as a solid polymer material, solid polymer, or a fiber composite material. However, formation of the anti-scatter grid 314 is not limited thereto.

The rotating frame 304 may receive a driving signal from the rotation driving unit 310 and may rotate the X-ray generating unit 306 and the X-ray detecting unit 108 at a predetermined rotation speed. The rotating frame 304 may receive the driving signal and power from the rotation driving unit 310 while the rotating frame 104 contacts the rotation driving unit 310 via a slip ring (not shown). Also, the rotating frame 304 may receive the driving signal and power from the rotation driving unit 310 in a wireless manner.

The X-ray generating unit 306 may receive a voltage and current from a power distribution unit (PDU) (not shown) via a slip ring (not shown) and then a high voltage generating unit (not shown), and then may generate and emit an X-ray. When the high voltage generating unit applies a predetermined voltage (hereinafter, referred as the tube voltage) to the X-ray generating unit 306, the X-ray generating unit 306 may generate X-rays having a plurality of energy spectrums that correspond to the tube voltage.

The X-ray generated by the X-ray generating unit 306 may be emitted by a collimator 312 to have a predetermined shape.

The X-ray detecting unit 308 may be positioned to face the X-ray generating unit 306. The X-ray detecting unit 308 may include a plurality of X-ray detecting devices. Each of the plurality of X-ray detecting devices may establish one channel, but one or more embodiments of the present invention are not limited thereto.

The X-ray detecting unit 308 may detect the X-ray that is generated by the X-ray generating unit 306 and that is transmitted via the object, and may generate an electrical signal corresponding to the intensity of the detected X-ray.

The X-ray detecting unit 308 may include an indirect-type X-ray detector for detecting radiation after converting the radiation into light, and a direct-type X-ray detector for detecting radiation after directly converting the radiation into electric charges. The indirect-type X-ray detector may use a scintillator. The direct-type X-ray detector may use a photon counting detector. The DAS 316 may be connected to the X-ray detecting unit 308. Electrical signals generated by the X-ray detecting unit 308 may be wiredly or wirelessly collected by the DAS 316. The electrical signals generated by the X-ray detecting unit 308 may be provided to an analog-to-digital converter (not shown) via an amplifier (not shown).

According to a slice thickness or the number of slices, only some of a plurality of pieces of data collected by the X-ray detecting unit 308 may be provided to the image processing unit 326 via the data transmitting unit 320, or the image processing unit 326 may select only some of the plurality of pieces of data.

Such a digital signal may be provided to the image processing unit 326 via the data transmitting unit 320. The digital signal may be wiredly or wirelessly transmitted to the image processing unit 326 via the data transmitting unit 320.

The control unit 318 may control an operation of each of the elements in the CT apparatus 300. For example, the control unit 318 may control operations of the table 305, the rotation driving unit 310, the collimator 312, the DAS 316, the storage unit 324, the image processing unit 326, the input unit 328, the display unit 330, the communication unit 332, or the like.

The image processing unit 326 may receive data obtained from the DAS 316 (e.g., pure data before a processing operation), via the data transmitting unit 320, and may perform pre-processing.

The pre-processing may include a process of correcting sensitivity irregularity between channels, a process of correcting a signal loss due to a rapid decrease of signal strength or due to an X-ray absorbing material such as metal, or the like.

Data output from the image processing unit 326 may be referred as raw data or projection data. The projection data may be stored in the storage unit 324 together with scanning conditions (e.g., the tube voltage, a scanning angle, etc.) during acquisition of the projection data.

The projection data may be a group of data values that correspond to the intensity of the X-ray that has passed through the object. For convenience of description, a group of a plurality of pieces of projection data that are simultaneously obtained from all channels by a same scan angle is referred as a projection data set.

The storage unit 324 may include at least one storage medium selected from among a flash memory type storage medium, a hard disk type storage medium, a multimedia card micro type storage medium, card type memory (for example, a secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disk, and an optical disk.

The image processing unit 326 may reconstruct a cross-sectional image of the object by using the projection data set. The cross-sectional image may be a 3D image. In other words, the image processing unit 326 may reconstruct a 3D image of the object 10 by using a cone beam reconstruction method or the like based on the obtained projection data set.

The input unit 328 may receive an external input with respect to an X-ray tomography imaging condition, an image processing condition, or the like. For example, the X-ray tomography imaging conditions may include a plurality of tube voltages, energy value setting with respect to a plurality of X-rays, selection of an image-capturing protocol, selection of an image reconstruction method, setting of a FOV area, the number of slices, a slice thickness, setting of image post-processing parameters, or the like. The image processing condition may include a resolution of an image, an attenuation coefficient setting with respect to the image, setting of an image combining ratio, or the like.

The input unit 328 may include a device for receiving a predetermined input from an external source. For example, the input unit 328 may include a microphone, a keyboard, a mouse, a joystick, a touch pad, a touch pen, a voice recognition device, a gesture recognition device, or the like.

The display unit 330 may display an X-ray tomography image reconstructed by the image processing unit 326.

Exchanges of data, power, or the like between the aforementioned elements may be performed by at least one of wired communication, wireless communication, and optical communication.

The communication unit 332 corresponds to the communication 170 of FIG. 1. Accordingly, the communication unit 332 may include a close-distance communication module, a wired communication module, and a mobile communication module, and may be wiredly or wirelessly connected to a network and perform communication with the server 334, an external medical apparatus, or an external device. A detailed description of the communication unit 332 is the same as that of the communication unit 170 of FIG. 1.

Figure 4:
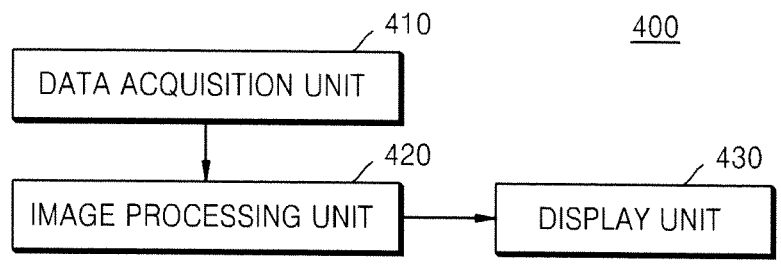
FIG. 4 is a block diagram of a medical imaging apparatus according to an embodiment of the present invention.

FIG. 4 is a block diagram of a medical imaging apparatus 400 according to an embodiment of the present invention. Referring to FIG. 4, the medical imaging apparatus 400 may include a data acquisition unit 410, an image processing unit 420, and a display unit 430.

The data acquisition unit 410 of FIG. 4 may correspond to at least one selected from the ultrasound transmission/reception unit 115 of FIG. 1, the RF receiving unit 238 or the operating unit 260 of FIG. 2, and the X-ray detecting unit 308, the DAS 316, and the data transmitting unit 320 of FIG. 3.

The image processing unit 420 of FIG. 4 may correspond to at least one selected from the image processing unit 150 of FIG. 1, the image processing unit 262 of FIG. 2, and the image processing unit 326 of FIG. 3. The display unit 430 of FIG. 4 may correspond to at least one selected from the display unit 160 of FIG. 1, the output unit 264 of FIG. 2, and the display unit 330 of FIG. 3.

Accordingly, the descriptions of the data acquisition unit 410, the image processing unit 420, and the display unit 430 of FIG. 4 as presented below may equally apply to the components of FIGS. 1-3 corresponding thereto.

The data acquisition unit 410 may acquire 3D data (for example, volume data) about an object. For example, when the medical imaging apparatus 400 is the ultrasound diagnosis apparatus 100, the medical imaging apparatus 400 may receive an echo signal reflected from the object, process the received echo signal, and thus acquire ultrasound volume data.

When the medical imaging apparatus 400 is the MRI apparatus 200, the medical imaging apparatus 400 may receive an MR signal via an RF coil, process the received MR signal, and thus acquire MR volume data.

When the medical imaging apparatus 400 is the CT apparatus 300, the medical imaging apparatus 400 may detect an X-ray transmitted via the object, generate an electrical signal corresponding to the intensity of the detected X-ray, process the electrical signal, and thus acquire CT volume data.

The image processing unit 420 may generate a 3D image of the object based on the acquired 3D data. The 3D image may include a voxel that may be a basic unit of a 3D image.

The image processing unit 420 may extract a muscle tissue curve corresponding to the muscle tissue shape of the object by grouping voxels included in the 3D image.

For example, the image processing unit 420 may analyze a generated medical image to detect the type of the object, and may also analyze the voxels based on the shape of a muscle tissue corresponding to the detected object type. Information about the shape of the muscle tissue corresponding to the detected object type may be information pre-stored in the medical imaging apparatus 400 or information received from a server or an external apparatus.

The image processing unit 420 may detect voxels included in the same muscle tissue by analyzing the brightness, position, size, shape, density, and the like of the voxels included in the generated medical image, and may extract a muscle tissue figure obtained by connecting the detected voxels to one another.

The muscle tissue figure may be a dot, a line, a surface, or a three-dimensional structure. For convenience of explanation, a case where the muscle tissue figure is a curved line will now be described. Accordingly, hereinafter, a muscle tissue curve will be described.

For example, when the object is a heart, the image processing unit 420 may analyze the brightness, position, size, shape, density, and the like of the voxels included in a generated medical image of the heart and group the voxels according to a result of the analysis based on the shape of muscle tissue that forms the muscle of the heart (e.g., represented as an S shape because fibers constituting the heart muscle are twisted), thereby extracting a heart muscle tissue curve.

Since the object is highly likely to move based on a muscular motion, when the image processing unit 420 extracts a muscle tissue curve corresponding to the muscle tissue shape of the object and analyzes a motion of the object based on the extracted muscle tissue curve as described above, the accuracy of a result of the analysis may increase.

Since the object is highly likely to move along the muscle tissue while the shape of the muscle tissue remains constant, the image processing unit 420 may extract the muscle tissue curve by tracking motions of the voxels included in the muscle tissue.

The image processing unit 420 may group speckles represented in a particular pattern on an ultrasound image based on a received speckle signal (i.e., an ultrasound signal), and set each group to be a voxel. A single voxel may include a single speckle or a plurality of speckles.

Figure 6A:
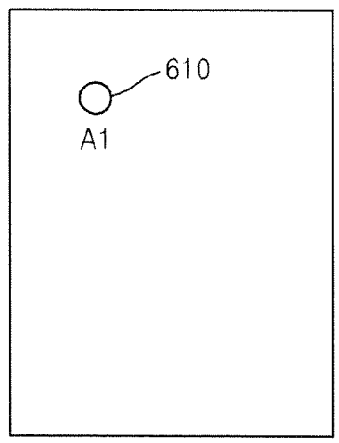
FIGS. 6A-6D and 7 are views for explaining a method of extracting a muscle tissue curve, according to an embodiment of the present invention.

The image processing unit 420 may acquire a plurality of image frames of the object according to time and track the motions of the voxels. This will now be described in greater detail with reference to FIGS. 6A-6D and 7. FIGS. 6A and 6C illustrate an n-th frame, and FIGS. 6B and 6D illustrate an (n+1)th frame.

Figure 6B:
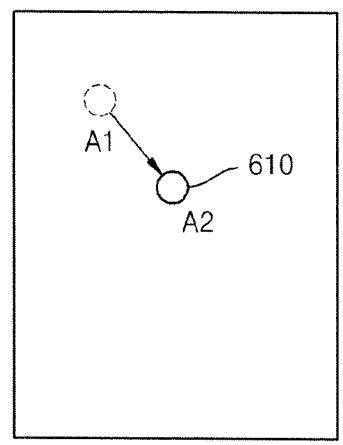
Figure 6C:
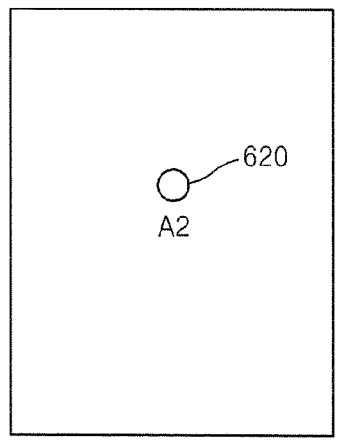

Referring to FIGS. 6A and 6B, the image processing unit 420 may track a movement of a first voxel 610 positioned at a point A1 in the n-th frame to a point A2 in the (n+1)th frame by using voxel tracking.

Figure 6D:
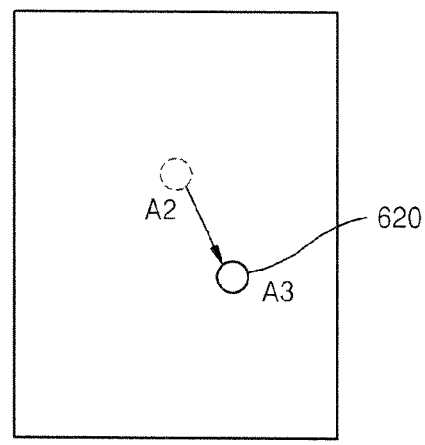

Referring to FIGS. 6C and 6D, the image processing unit 420 may track a movement of a second voxel 620 positioned at the point A2 (i.e., the position of the first voxel 610 in the (n+1)th frame) in the n-th frame to a point A3 in the (n+1)th frame by using voxel tracking.

Figure 7:
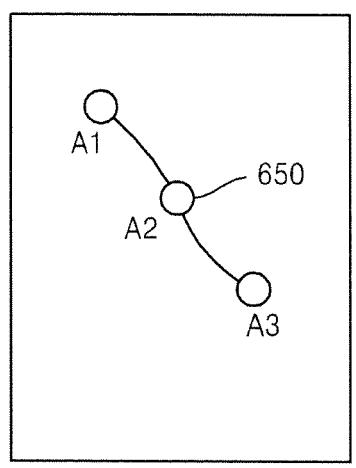

Accordingly, as illustrated in FIG. 7, the image processing unit 420 may extract a muscle tissue curve 650 by connecting the points A1, A2, and A3.

Although not illustrated, a movement of a third voxel positioned at the point A3 (i.e., the position of the second voxel 620 in the (n+1)th frame) to a point A4 in the (n+1)th frame may be tracked in the same manner as that described above, and thus the point A4 may be connected to the muscle tissue curve 650.

The image processing unit 420 may more accurately track the motions of the voxels as the time interval between frames decreases, and accordingly a more accurate muscle tissue curve may be extracted.

The image processing unit 420 may detect a voxel of which brightness, size, position, shape, density, and the like are similar to those of a specific voxel included in an n-th frame image, from an (n+1)th frame image. Accordingly, the image processing unit 420 may determine the position of the detected voxel (i.e., the position in the (n+1)th frame) as a position where the specific voxel in the n-th frame has been moved. In this way, voxel tracking may be performed.

The image processing unit 420 may analyze the motion of the object based on a motion of the muscle tissue curve. For example, the image processing unit 420 may analyze a curvature and vertical and horizontal distances of the muscle tissue curve, a distance between voxels, and the like, and may also analyze variations in respective distances of the muscle tissue curve in first and second directions and in the curvature of the muscle tissue curve, and the like according to time. This will be described in greater detail later with reference to FIGS. 10, 11A, and 11B.

The display unit 430 may display results of the analyses of the motions of the extracted muscle tissue curve and the object. For example, the display unit 430 may display a 3D image of the object and may also display a muscle tissue curve corresponding to the 3D image such that the muscle tissue curve may overlap the 3D image. Accordingly, a user may easily ascertain a position of the muscle tissue curve on the object.

Alternatively, the display unit 430 may display a specific time point in the motion cycle of the object and a muscle tissue curve of the object in correspondence to each other.

This will be described in greater detail later with reference to FIG. 15.

FIGS. 1-4 show block diagrams of the medical imaging apparatuses 100, 200, 300, and 400 according to embodiments of the present invention. The components illustrated in FIGS. 1-4 may be combined or omitted according to the specification of an ultrasound diagnosis apparatus that is being actually implemented, or additional components may be included in the block diagrams of FIGS. 1-4. In other words, two or more components may be combined into a single component, or a single component may be divided into two or more components. A function performed in each block is only an example to explain an embodiment of the present invention, and a detailed operation or device of each block does not limit the scope of the present invention.

Figure 5:
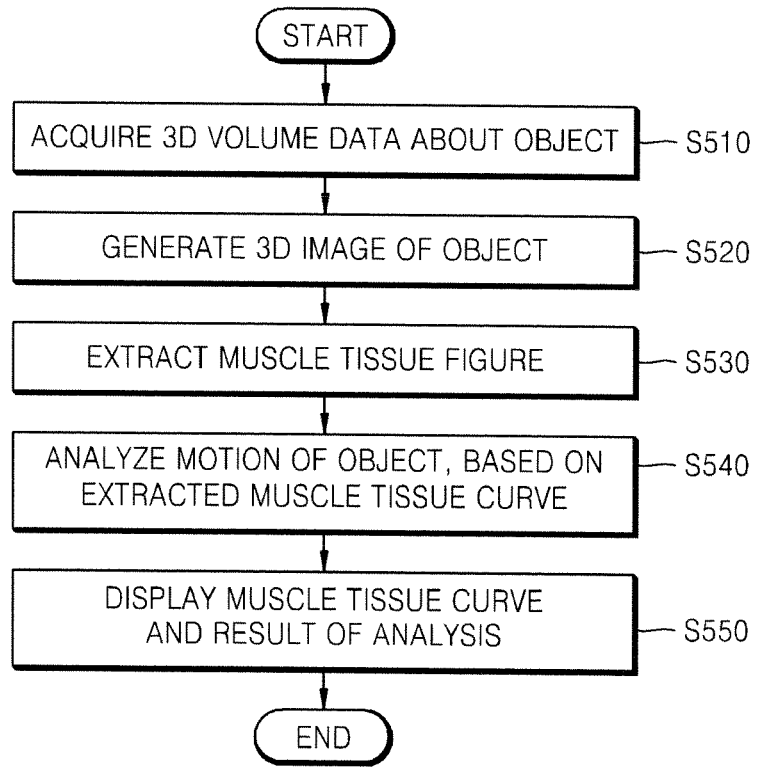
FIG. 5 is a flowchart of an operation of the medical imaging apparatus of FIG. 4, according to an embodiment of the present invention.

FIG. 5 is a flowchart of an operation of the medical imaging apparatus 400 of FIG. 4, according to an embodiment of the present invention. For convenience of explanation, a case where the object is a heart will now be described. However, the embodiments of the present invention are not limited thereto.

Referring to FIG. 5, the medical imaging apparatus 400 may acquire 3D volume data about an object, in operation S510. In this case, the medical imaging apparatus 400 may acquire the 3D volume data about the object by directly scanning the object or by receiving data obtained by an external medical apparatus, such as, an ultrasound diagnosis apparatus, a CT apparatus, or an MRI apparatus, or may read out pre-stored 3D volume data.

For example, the 3D volume data may be, but is not limited to, at least one selected from ultrasound volume data, CT volume data, and MR volume data.

In operation S520, the medical imaging apparatus 400 may generate a 3D image of the object based on the acquired 3D volume data. The 3D image may be, but is not limited thereto, at least one selected from a 3D ultrasound image, a 3D CT image, and a 3D MR image.

In operation S530, the medical imaging apparatus 400 may extract a muscle tissue figure corresponding to the muscle tissue shape of the object by grouping the voxels included in the 3D image.

For example, the medical imaging apparatus 400 may analyze the generated 3D image to detect the type of the object, and may also analyze the voxels based on the shape of a muscle tissue corresponding to the detected object type. Information about the shape of the muscle tissue corresponding to the detected object type may be information pre-stored in the medical imaging apparatus 400 or information received from a server or an external apparatus.

For example, the medical imaging apparatus 400 may detect voxels included in the same muscle tissue by tracking the voxels included in the generated 3D image based on the brightness, position, size, shape, density, and the like of the voxels, and may extract a muscle tissue figure obtained by connecting the detected voxels to one another.

Alternatively, the medical imaging apparatus 400 may extract the muscle tissue figure by tracking motions of the voxels included in the muscle tissue at a plurality of frames based on time and connecting the points where the voxels have been moved to each other. This has been described above in detail with reference to FIGS. 6A-6D and 7, and thus, a repeated description thereof will be omitted. The medical imaging apparatus 400 may extract only a muscle tissue figure of a reference region in the generated 3D image by receiving a user input of selecting the reference region from the generated 3D image and by grouping the voxels included in the selected reference region.

Figure 8:
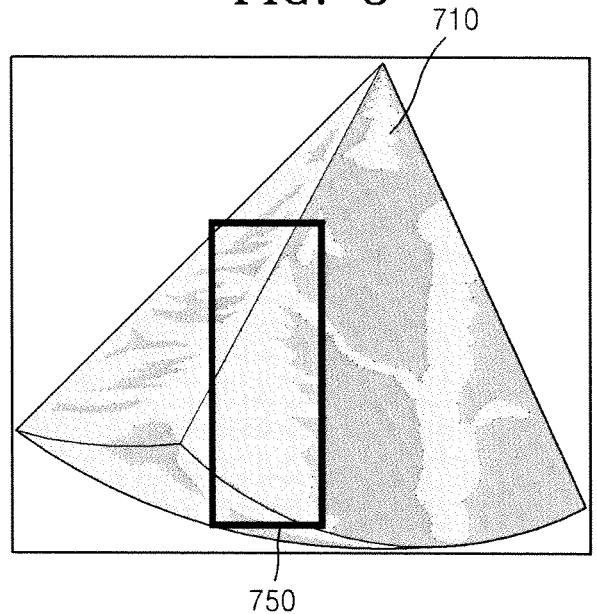
FIGS. 8-15 are views for explaining the operation illustrated in FIG. 5.

For example, as illustrated in FIG. 8, the display unit 430 may display a FIG. 750 to select a certain region from a medical image 710 of the object. The medical image 710 may be a 3D image of the object, and may be at least one selected from a 3D ultrasound image, a 3D CT image, and a 3D MR image. However, the embodiments of the present invention are not limited thereto.

A user may select a reference region that is to be analyzed by using the FIG. 750 displayed on the display unit 430. In this case, the size and shape of the displayed FIG. 750 may vary, and accordingly, various sizes and various shapes may be selected for the reference region.

As described above, when the reference region is selected according to a user input, the medical imaging apparatus 400 may analyze the characteristics of the voxels included in the selected reference region and may group the voxels according to a result of the analysis. Thus, the medical imaging apparatus 400 may analyze only a motion of a specific region of the object that the user wants.

For example, the medical imaging apparatus 400 may detect the voxels included in the same muscle tissue by tracking the voxels included in the reference region based on the brightness, position, size, shape, density, and the like of the voxels included in the reference region, and may extract a muscle tissue figure obtained by connecting the detected voxels to one another.

As described above, although the muscle tissue figure may be a dot, a line, a surface, or a 3D structure, a case where the muscle tissue figure is a curved line will be illustrated and described for convenience of explanation. Accordingly, a muscle tissue curve will now be described.

Figure 9A:
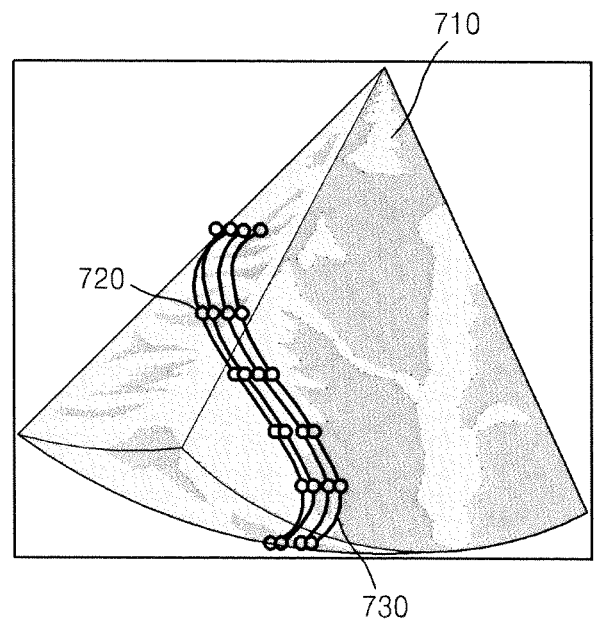
Figure 9B:
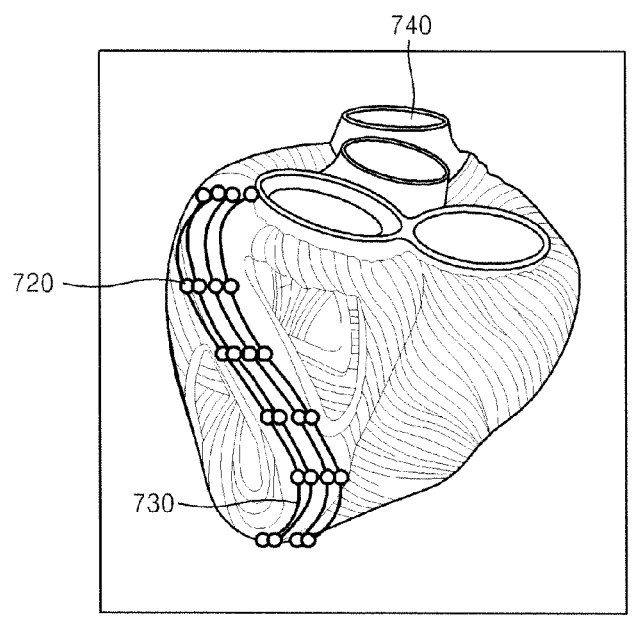

The extracted muscle tissue curve may be displayed on the display unit 430. For example, as illustrated in FIG. 9A, muscle tissue curves 730 may be displayed to overlap the medical image 710 displayed on the display unit 430. Alternatively, as illustrated in FIG. 9B, the muscle tissue curves 730 may be displayed to overlap a 3D modelling image 740 of the object. The medical image 710 may be an ultrasound image, a CT image, an MR image, or the like of the object. The 3D modeling image 740 may be an image obtained by modeling the object by using any of various methods.

Figure 9C:
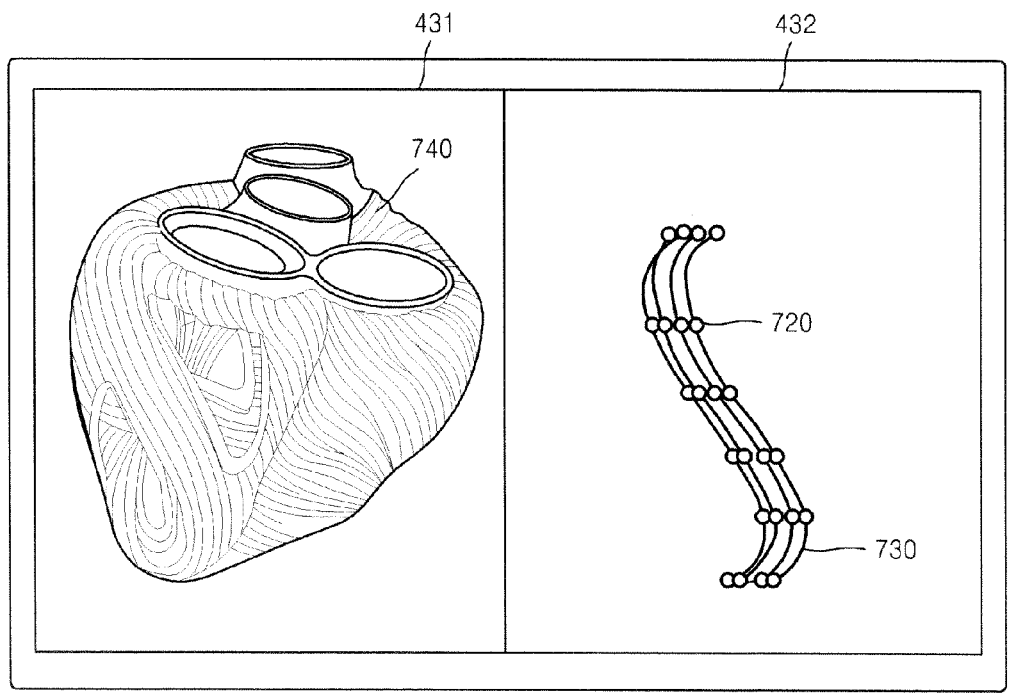

Alternatively, as illustrated in FIG. 9C, the 3D modeling image 740 and the muscle tissue curves 730 may be separately displayed on the display unit 430. For example, the 3D modeling image 740 may be displayed in a first area 431 of the display unit 430, and the muscle tissue curves 730 may be displayed in a second area 432 of the display unit 430.

Although not shown in FIG. 9C, the medical image 710, such as, an ultrasound image, an MR image, or a CT image, of the object instead of the 3D modeling image 740 may be displayed in the first area 431.

A specific voxel included in an extracted muscle tissue curve may be indicated by a point 720, and the specific voxel indicated by the point 720 may be a voxel that is tracked to track a motion of the extracted muscle tissue curve.

In operation S540, the medical imaging apparatus 400 may analyze the motion of the object based on the extracted muscle tissue curve.

For example, the medical imaging apparatus 400 may track the motion of the extracted muscle tissue curve by tracking the voxels included in the extracted muscle tissue curve.

The medical imaging apparatus 400 may detect a voxel of which brightness, size, position, shape, density, and the like are similar to those of a specific voxel included in an n-th frame image, from an (n+1)th frame image, and may determine the position of the detected voxel (i.e., the position in the (n+1)th frame) as a position where the specific voxel in the n-th frame image has moved. In this way, the medical imaging apparatus 400 may track motions of the voxels included in the extracted muscle tissue curve to thereby track the motion of the extracted muscle tissue curve.

In operation S550, the medical imaging apparatus 400 may display the muscle tissue curve and a result of the analysis.

For example, the medical imaging apparatus 400 may track positions where a muscle tissue curve has moved in time, according to the above-described voxel tracking, and may display a motion of the muscle tissue curve in time on the display unit 430. For example, as illustrated in FIG. 10, the medical imaging apparatus 400 may extract muscle tissue curves (a) at a first time point (hereinafter, first muscle tissue curves), muscle tissue curves (b) at a second time point (hereinafter, second muscle tissue curves), and muscle tissue curves (c) at a third time point (hereinafter, third muscle tissue curves), and may sequentially display the first, second, and third muscle tissue curves (a), (b), and (c) on the display unit 430.

Furthermore, the medical imaging apparatus 400 may measure a curvature and vertical and horizontal distances of the muscle tissue curve, a distance between the voxels included in the muscle tissue curve, and the like, and may calculate a variation in a distance of the muscle tissue curve in a particular direction, a variation in the curvature of the muscle tissue curve, and the like by using the measured values.

Figure 10A:
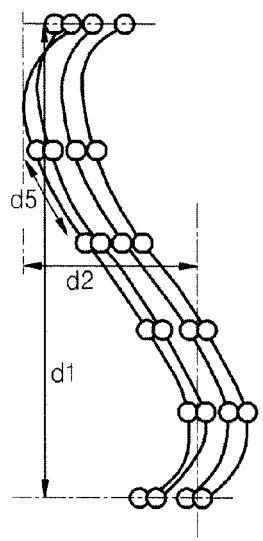
Figure 10B:
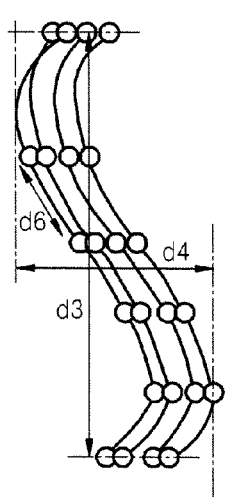
Figure 10C:
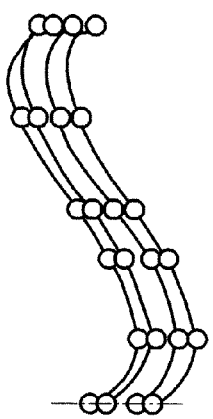

For example, as illustrated in FIG. 10, the medical imaging apparatus 400 may measure a vertical distance d1 and a horizontal distance d2 of the first muscle tissue curves and a vertical distance d3 and a horizontal distance d4 of the second muscle tissue curves, and calculate a distance change rate, namely, a vertical distance change rate and a horizontal distance change rate, based on the measured vertical distances d1 and d3 and the measured horizontal distances d2 and d4. The medical imaging apparatus 400 may also measure a distance d5 between voxels included in each first muscle tissue curve and a distance d6 between voxels included in each second muscle tissue curve to calculate an inter-voxel distance change rate, and may measure respective curvatures of the first and second muscle tissue curves to calculate a curvature change rate.

Figure 11A:
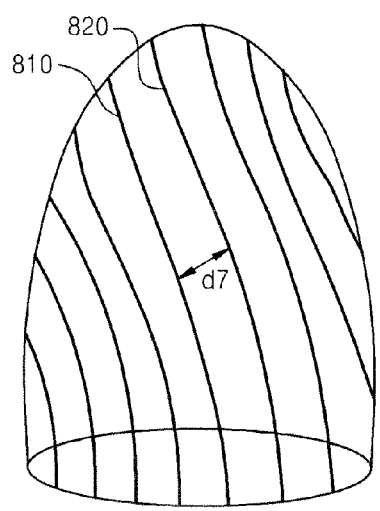
Figure 11B:
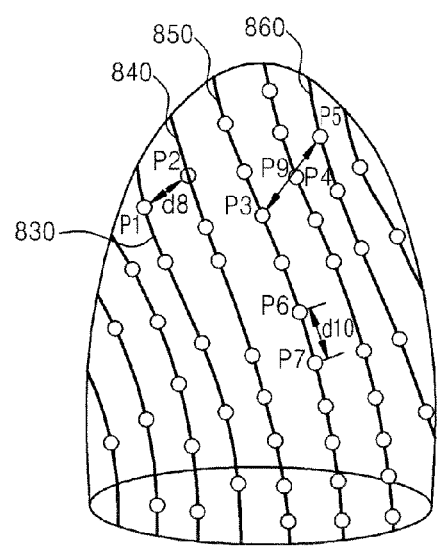

As illustrated in FIGS. 11A and 11B, the medical imaging apparatus 400 may display a plurality of extracted muscle tissue curves to overlap a 3D model, such as a simple rotating body, and may calculate a distance change rate by using the displayed muscle tissue curves.

For example, as illustrated in FIG. 11A, the medical imaging apparatus 400 may calculate a distance change rate between adjacent muscle tissue curves 810 and 820, that is, may calculate the distance change rate by measuring a shortest distance between the adjacent muscle tissue curves 810 and 820.

As illustrated in FIG. 11B, when measuring a distance between adjacent muscle tissue curves, the medical imaging apparatus 400 may measure the distance based on dots (for example, dots representing extracted voxels) included in the muscle tissue curves. For example, to measure a distance between a first muscle tissue curve 830 and a second muscle tissue curve 840, the medical imaging apparatus 400 may measure a distance d8 between a first point P1 included in the first muscle tissue curve 830 and a second point P2 included in the second muscle tissue curve 840.

The medical imaging apparatus 400 may measure a distance between muscle tissue curves by using dots existing on a straight line. For example, a distance d9 between a third muscle tissue curve 850 and a fifth muscle tissue curve 860 may be measured based on a straight line that connects a third point P3, a fourth point P4, and a fifth point P5.

The medical imaging apparatus 400 may calculate a distance change rate between points included in a muscle tissue curve. For example, the medical imaging apparatus 400 may calculate the distance change rate by measuring a distance d10 between a sixth point P6 and a seventh point P7 included in the third muscle tissue curve 850. The medical imaging apparatus 400 may display the measured or calculated values as a numerical value, a graph, or the like, determine normality or abnormality of the motion of the object, flexibility or inflexibility of the muscle tissue of the object, and the like based on the measured values and the calculated values, and display a result of the determination.

Figure 12:
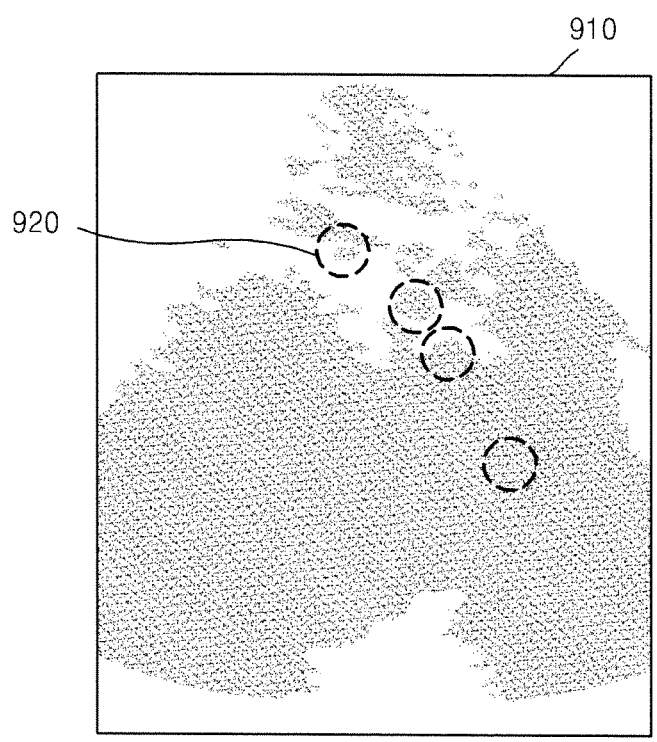

For example, referring to FIG. 12, the medical imaging apparatus 400 may display a medical image 910 of an object on the display unit 430, analyze a motion of a muscle tissue curve of the object, and, when the motion of the object is abnormal, display an abnormal portion of the object by a FIG. 920 or display a normal portion and the abnormal portion in different colors. According to the amount of motion of a muscle tissue curve, the medical imaging apparatus 400 may display corresponding colors. For example, the medical imaging apparatus 400 may calculate a distance change rate value or curvature change rate value of each predetermined region of a muscle tissue curve and may map and display a color corresponding to the calculated distance change rate value or curvature change rate value.

Furthermore, the medical imaging apparatus 400 may analyze the motion of the muscle tissue of the object and display a motion vector corresponding to the analyzed motion. For example, the medical imaging apparatus 400 may acquire a motion vector of a portion of the muscle tissue by using a difference between the coordinate value of the portion in a previous frame and that of the portion in a current frame, and display the acquired motion vector on the display unit 430. This will now be described in greater detail with reference to FIGS. 13A-13D.

Figure 13A:
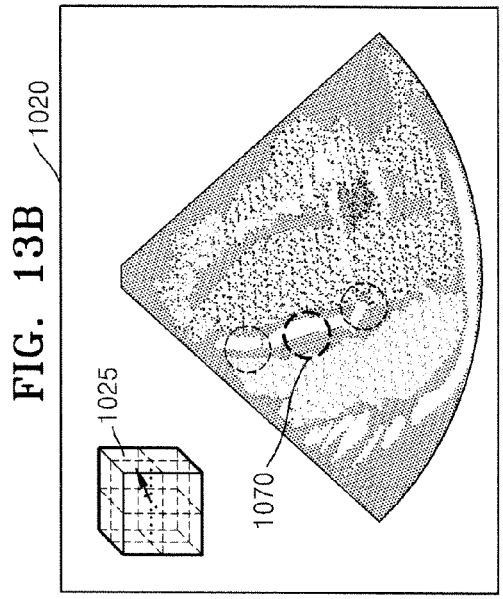
Figure 13B:
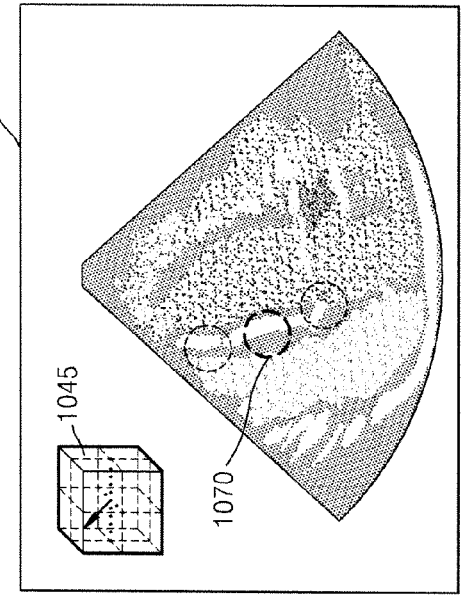
Figure 13C:
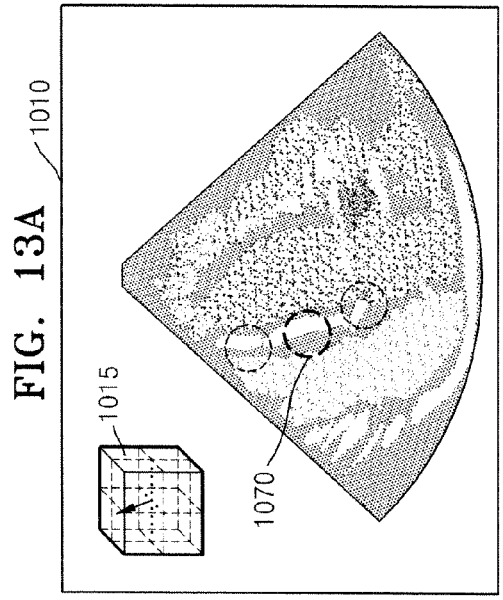
Figure 13D:
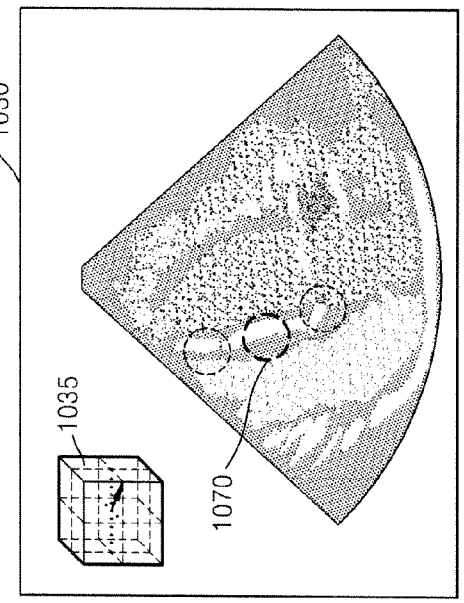

FIGS. 13A-13D illustrate a plurality of medical image frames displayed on the display unit 430. FIG. 13A illustrates an n-th frame 1010, FIG. 13B illustrates an (n+1)th frame 1020, FIG. 13C illustrates an (n+2)th frame 1030, and FIG. 13D illustrates an (n+3)th frame 1040.

In this case, a medical image displayed on the display unit 430 may be a 3D image of the object that includes a muscle tissue.

As illustrated in FIGS. 13A-13D, when a user selects a first region 1070 of the muscle tissue, the medical imaging apparatus 400 may acquire a motion vector of the first region 1070 by comparing a coordinate value of the first region 1070 in a previous frame (i.e., an (n−1)th frame) with that of the first region 1070 in a current frame (i.e., the n-th frame 1010). The coordinate value may be a 3D coordinate value, and the medical imaging apparatus 400 may indicate via an arrow the acquired motion vector on a 3D coordinate space 1015 included in the n-th frame 1010.

The medical imaging apparatus 400 may acquire a motion vector of the first region 1070 by comparing the coordinate value of the first region 1070 in the n-th frame 1010 with a coordinate value of the first region 1070 in the (n+1)th frame 1020, and may indicate via an arrows the acquired motion vector on a 3D coordinate space 1025 included in the (n+1)th frame 1020.

In this way, motion vectors of the first region 1070 that respectively correspond to the (n+2)th frame 1030 and the (n+3)th frame 1040 may be acquired and respectively displayed on 3D coordinate spaces 1035 and 1045 via arrows.

Furthermore, the medical imaging apparatus 400 may display a coordinate value indicated by the motion vector (i.e., an arrow) by using a text.

The medical imaging apparatus 400 may display a color corresponding to a motion vector on a medical image.

For example, when a first axis, a second axis, and a third axis that are perpendicular to one another in each of the 3D coordinate spaces 1015, 1025, 1035, and 1045 are respectively an X axis, a Y axis, and a Z axis, a starting point of each of the 3D coordinate spaces 1015, 1025, 1035, and 1045 may be mapped with a white color. Each of the 3D coordinate spaces 1015, 1025, 1035, and 1045 may be mapped with a first color having a higher chroma in a positive direction of the X axis from the starting point. Each of the 3D coordinate spaces 1015, 1025, 1035, and 1045 may be mapped with a second color having a higher chroma in a negative direction of the X axis from the starting point. Each of the 3D coordinate spaces 1015, 1025, 1035, and 1045 may be mapped with a third color having a higher chroma in a positive direction of the Y axis from the starting point. Each of the 3D coordinate spaces 1015, 1025, 1035, and 1045 may be mapped with a fourth color having a higher chroma in a negative direction of the Y axis from the starting point. Each of the 3D coordinate spaces 1015, 1025, 1035, and 1045 may be mapped with a fifth color having a higher chroma in a positive direction of the Z axis from the starting point. Each of the 3D coordinate spaces 1015, 1025, 1035, and 1045 may be mapped with a sixth color having a higher chroma in a negative direction of the Z axis from the starting point.

Accordingly, a region of each of the 3D coordinate spaces 1015, 1025, 1035, and 1045 may be mapped with a different color which is a mixture of at least two selected from the first through sixth colors, based on the coordinate value of the region.

As described above, the medical imaging apparatus 400 may acquire a motion vector of the selected first region 1070 by analyzing the motion of a muscle tissue curve of the first region 1070, and may display a color corresponding to the coordinate value indicated by the acquired motion vector on the first region 1070.

Accordingly, a user may instinctively ascertain a motion of a muscle tissue and a motion tendency of the muscle tissue based on a motion vector indicated on a 3D coordinate space (for example, indicated by an arrow) and a color displayed on a medical image.

When a motion of the muscle tissue of a heart is analyzed as described above, it may be determined based on a result of the analysis whether a motionless portion of the heart has an abnormality, such as death of the muscle tissue of the motionless portion. Accordingly, the result of the analysis may be used as an index to predict blockage of a coronary artery or other heart diseases.

Figure 14:
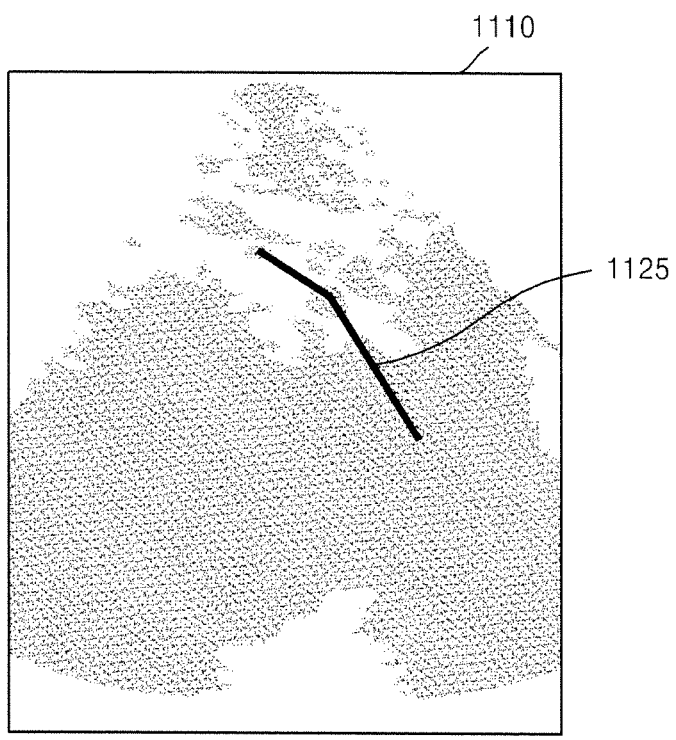

Furthermore, the medical imaging apparatus 400 may track the inner or outer surface of the muscle of the object by analyzing the motion of the muscle tissue curve of the object. For example, referring to FIG. 14, the medical imaging apparatus 400 may track the endocardium of the heart by analyzing the motion of the muscle tissue curve of the heart. Furthermore, the medical imaging apparatus 400 may display a medical image 1110 of the object on the display unit 430 and a tracked endocardium 1125. The tracked endocardium 1125 may be displayed to overlap the medical image 1110.

A method of analyzing the motion of the object is not limited to the above-described methods, and the motion of the object may be analyzed using various measuring and analyzing methods with respect to muscle tissue curves.

The medical imaging apparatus 400 may display motions of muscle tissue curves obtained according to a motion cycle of the object. Referring to FIG. 15, when the object is a heart, the display unit 430 may display an electrocardiogram (ECG) that represents a cardiac cycle and muscle tissue curves corresponding to specific time points of the cardiac cycle.

For example, the display unit 430 may display muscle tissue curves 1210 and 1220 corresponding to a diastolic end and a systolic end of the cardiac cycle. In this case, as illustrated in FIG. 15, the medical imaging apparatus 400 may display the muscle tissue curves 1210, 1220, and 1230 to overlap 3D modeling images.

In response to a user input for selecting a specific time point 1250 from the cardiac cycle displayed on the display unit 430, the medical imaging apparatus 400 may display a muscle tissue curve 1240 corresponding to the selected time point 1250.

Figure 15:
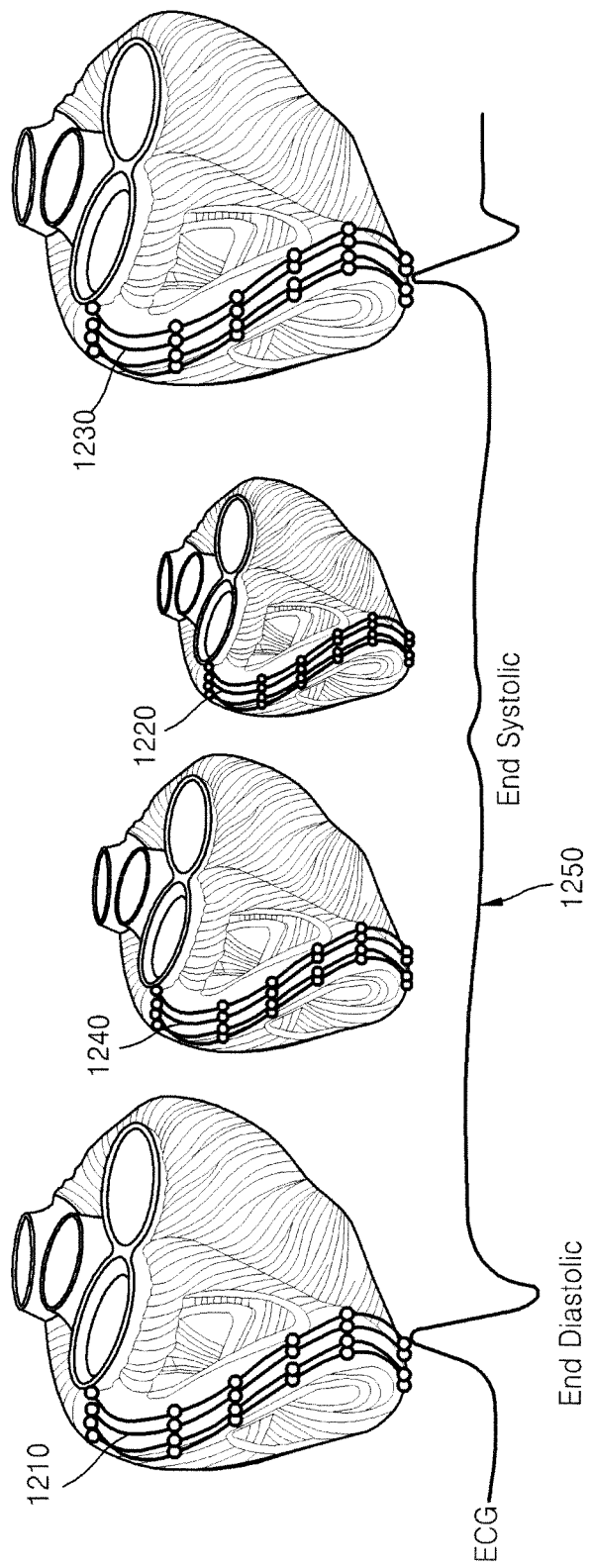

As illustrated in FIG. 15, muscle tissue curves may be displayed to overlap a 3D modeling image of an object. However, the embodiments of the present invention are not limited to this displaying method and muscle tissue curves may be displayed to overlap a medical image, or only muscle tissue curves may be displayed.

Although a muscle tissue curve has been illustrated above, the same description may be applied even when a muscle tissue figure is represented by a dot, a surface, a 3D structure, or the like.

Although a muscle tissue has been illustrated above, a bone, cartilage, an articulation, and a material (for example, ultrasound contrast agent microbubbles) injected into the human body may be utilized to analyze motions of various objects.

As described above, according to the one or more of the above embodiments of the present invention, the motion of an object may be analyzed based on the shape of a muscle tissue of the object, thereby increasing the accuracy of an analysis result.

A method of operating the medical imaging apparatus according to one or more embodiments of the present invention can be embodied as computer readable codes on a computer readable recording medium. The computer readable recording medium is any type of recording device that stores data which can thereafter be read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner. The exemplary embodiments should be considered in descriptive sense only and not for purposes of limitation. Descriptions of features or aspects within each embodiment should typically be considered as available for other similar features or aspects in other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating a medical imaging apparatus, the method comprising:
   acquiring three-dimensional (3D) volume data about an object;
   generating a 3D image based on the 3D volume data;
   extracting a muscle tissue figure corresponding to a muscle tissue shape of the object by grouping voxels included in the 3D image;
   analyzing a motion of the object based on the extracted muscle tissue figure; and
   displaying the extracted muscle tissue figure and a result of the analysis,
   wherein the extracting of the muscle tissue figure comprises connecting a first point where a first voxel included in the 3D image is located in n-th frame data, a second point where the first voxel is located in (n+1)-th frame data, and a third point where a second voxel located at the second point in n-th frame data is located in (n+1)-th frame data.

2. The method of claim 1, wherein the volume data comprises at least one selected from ultrasound volume data, computed tomography (CT) volume data, and magnetic resonance (MR) volume data.

3. The method of claim 1, further comprising receiving a user input for selecting a reference region,
   wherein the extracting of the muscle tissue figure comprises grouping voxels included in the selected reference region.

4. The method of claim 1, wherein the muscle tissue figure comprises at least one selected from a dot, a line, a surface, and a three-dimensional structure.

5. The method of claim 1, wherein the analyzing the motion of the object comprises tracking a motion of the muscle tissue figure by tracking voxels included in the muscle tissue figure.

6. The method of claim 1, wherein the analyzing the motion of the object comprises analyzing a change of a position of the muscle tissue figure in time.

7. The method of claim 1, wherein the displaying of the muscle tissue figure and the result of the analysis comprises displaying the muscle tissue figure such that the muscle tissue figure overlaps the 3D image.

8. The method of claim 1, wherein the displaying of the muscle tissue figure and the result of the analysis comprises displaying the muscle tissue figure of the object and a specific time point in a motion cycle of the object in correspondence to each other.

9. A medical imaging apparatus comprising:
   an image processor which generates a 3D image based on 3D volume data about an object, groups voxels included in the 3D image to extract a muscle tissue figure corresponding to a muscle tissue shape of the object, and analyzes a motion of the object based on the extracted muscle tissue figure; and
   a display which displays the extracted muscle tissue figure and a result of the analysis,
   wherein the image processor extracts the muscle tissue figure by connecting a first point where a first voxel included in the 3D image is located in n-th frame data, a second point where the first voxel is located in (n+1)-th frame data, and a third point where a second voxel located at the second point in n-th frame data is located in (n+1)-th frame data.

10. The medical imaging apparatus of claim 9, wherein the volume data comprises at least one selected from ultrasound volume data, computed tomography (CT) volume data, and magnetic resonance (MR) volume data.

11. The medical imaging apparatus of claim 9, further comprising a user interface which receives a user input for selecting a reference region,
   wherein the image processor extracts the muscle tissue figure by grouping voxels included in the selected reference region.

12. The medical imaging apparatus of claim 9, wherein the muscle tissue figure comprises at least one selected from a dot, a line, a surface, and a three-dimensional structure.

13. The medical imaging apparatus of claim 9, wherein the image processor analyzes the motion of the object by tracking a motion of the muscle tissue figure by tracking voxels included in the muscle tissue figure.

14. The medical imaging apparatus of claim 9, wherein the image processor analyzes the motion of the object based on a change of a position of the muscle tissue figure in time.

15. The medical imaging apparatus of claim 9, wherein the display displays the muscle tissue figure to overlap the 3D image.

16. The medical imaging apparatus of claim 9, wherein the display displays a specific time point in a motion cycle of the object and the muscle tissue figure of the object in correspondence to each other.

17. A non-transitory computer-readable recording medium having recorded thereon a computer program which, when executed by a computer, performs the method of claim 1.

* * * * *